Dec. 29, 1936.   W. C. GROENIGER   2,065,524
FLUID TRANSMISSION SYSTEM AND FITTING THEREFOR
Filed July 20, 1934   4 Sheets-Sheet 1
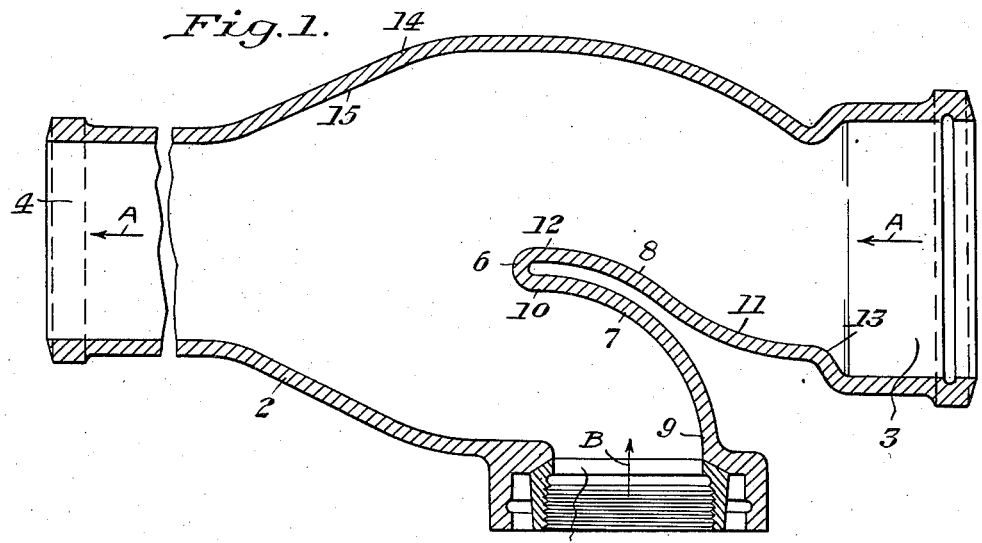
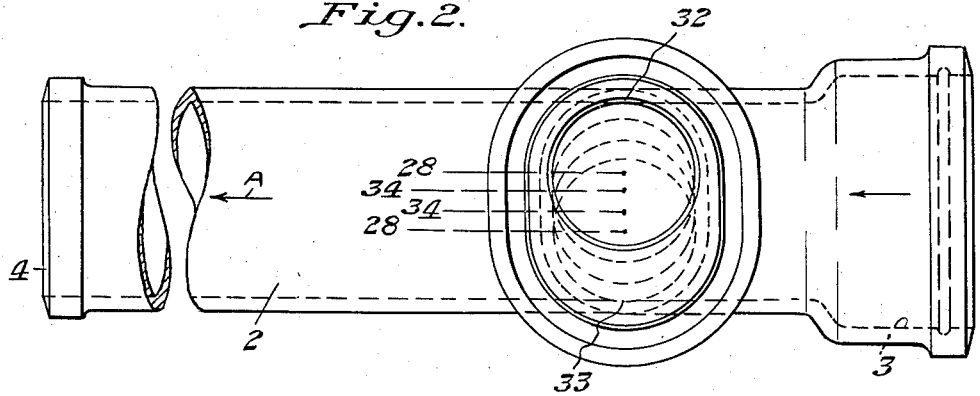
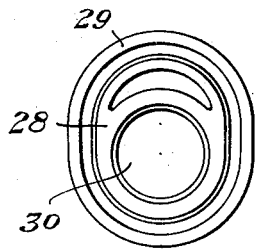 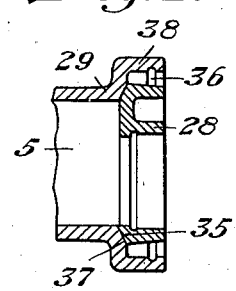 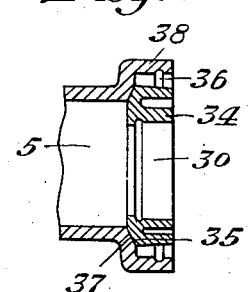
INVENTOR
William C. Groeniger
by his attorneys
Byrnes, Stebbins & Blenko Dec. 29, 1936.    W. C. GROENIGER    2,065,524
FLUID TRANSMISSION SYSTEM AND FITTING THEREFOR
Filed July 20, 1934    4 Sheets-Sheet 2
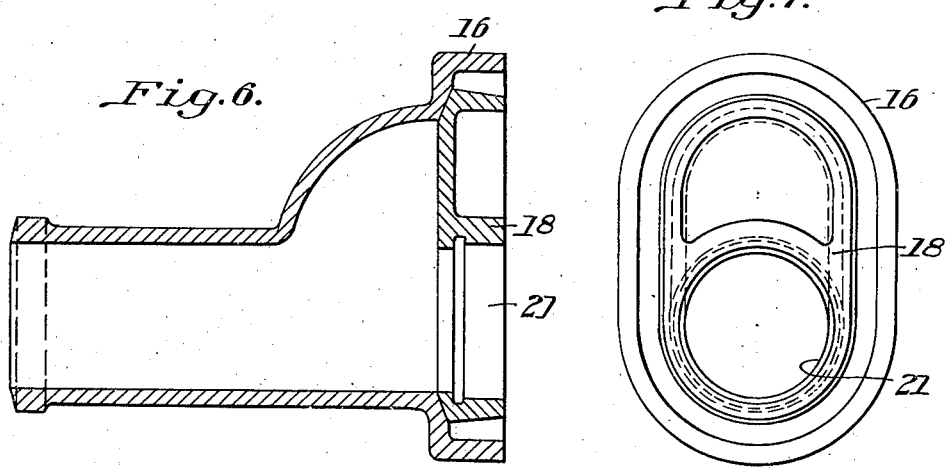
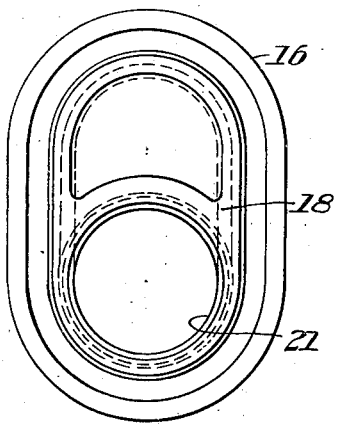
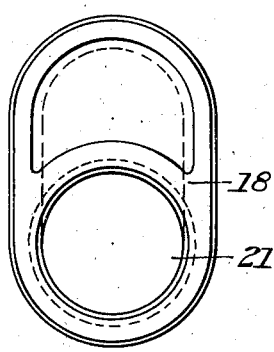
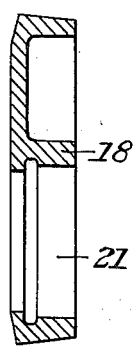
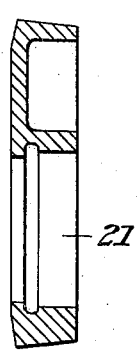
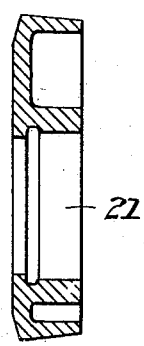
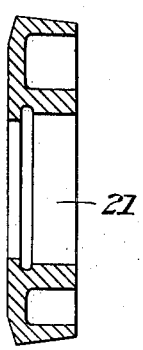
INVENTOR
William C. Groeniger
by his attorneys
Byrnes, Stebbins & Blenko Dec. 29, 1936.  W. C. GROENIGER  2,065,524
FLUID TRANSMISSION SYSTEM AND FITTING THEREFOR
Filed July 20, 1934  4 Sheets-Sheet 3

INVENTOR
William C. Groeniger
by his attorneys
Byrnes, Stebbins & Blenko

Dec. 29, 1936. W. C. GROENIGER 2,065,524
FLUID TRANSMISSION SYSTEM AND FITTING THEREFOR
Filed July 20, 1934 4 Sheets-Sheet 4
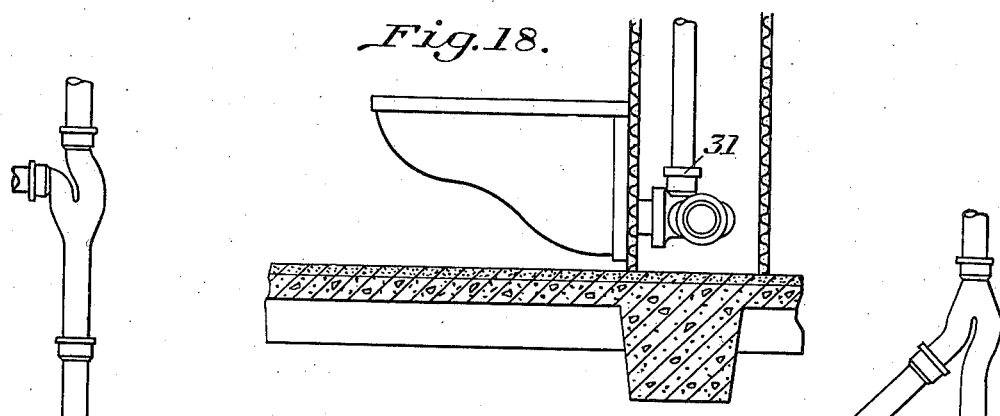
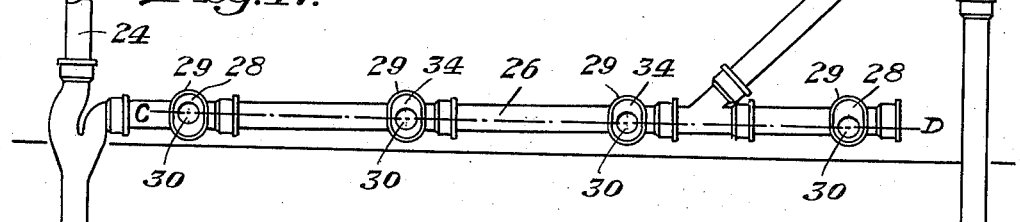
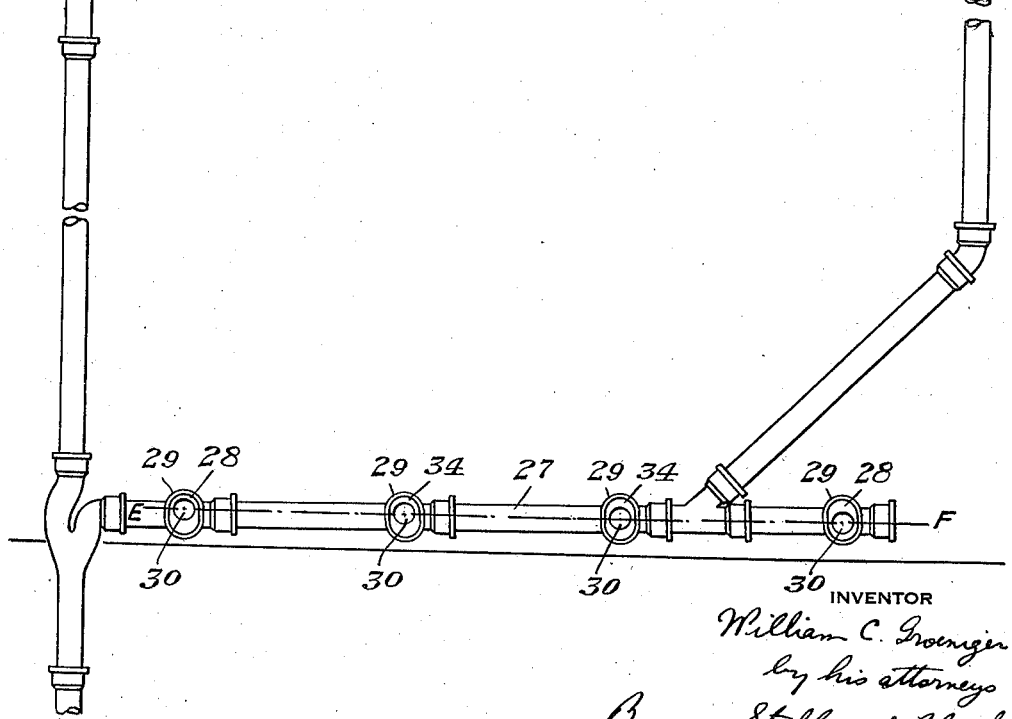

Patented Dec. 29, 1936

2,065,524

UNITED STATES PATENT OFFICE 2,065,524

FLUID TRANSMISSION SYSTEM AND FITTINGS THEREFOR

William C. Groeniger, Columbus, Ohio, assignor to John B. Pierce Foundation, New York, N. Y., a corporation of New York Application July 20, 1934, Serial No. 736,221

6 Claims. (Cl. 285—4)

This invention relates broadly to fluid transmission systems and fittings therefor, and more particularly to closed systems for conveying flowing fluids. It relates still more particularly to fluid transmission systems in which connections are adapted to be made between a main and branches having different spaced relationships with respect to the main.

The invention also relates to a fitting for connecting a branch and a main regardless of the relative position of the branch and main within certain limits.

Occasion often arises in the construction of fluid transmission systems for the connection of a main with a series of branches cooperating with the main in generally the same manner yet bearing slightly different spaced relationships with respect to the main. For example, it is common practice to provide a series or battery of fixtures which may comprise six or more aligned fixtures disposed at substantially the same level, all of which discharge into a common drain pipe which by reason of certain engineering considerations does not extend exactly parallel to the level of the fixtures, but is inclined thereto. It is necessary to slightly incline the drain in order to facilitate the discharge of waste from the fixtures.

It has heretofore been customary in connecting a series of water closets disposed at substantially the same level to a common drain pipe somewhat inclined to such level to utilize fittings of ordinary construction, selecting for each connection fittings of a size, length and curvature appropriate for that particular connection. On account of the fact that the spaced relationship between the common drain pipe and each closet is different from that between such pipe and each other closet, the ordinary fittings appropriate for making any given connection are not suitable for any other connection, and therefore a wide variety of sizes and shapes of fittings is necessary in order to connect even as many as four to six water closets to a common inclined drain. This not only greatly increases the expense of installing such a system by reason of requiring a great many different shapes and sizes of fittings, but also produces a result which is more or less unsightly by reason of the diversity of the fittings used for the various connections. In addition, by reason of the fact that different fittings are used in different connections, the frictional resistance offered to the flow of fluid through some of the connections may be appreciably greater than that offered in others, thereby reducing the efficiency of the system as a whole and hindering its proper operation.

This led to the design of fittings which embodied the adjustability necessary to obviate the disadvantages above referred to. In the prior art these fittings were designed so that the branch was extended transversely to the run or major axis of the fitting, beyond the limits of the radii of the run of the fitting to form an extended receiving chamber. This requires the making of two different fittings, one to serve when the discharge outlet of the fitting is to the right, one to serve when the discharge outlet of the fitting is to the left. These fittings are commonly called right and left hand fittings. This naturally doubles the stock, patterns and equipment required, increasing the cost over a design which does not require right and left hand fittings. Certain of the fittings in the prior art were designed with a modified T type of connection between the branch and the main in order to eliminate right and left hand fittings, but the defects of the T fitting structure of uniting fluid streams in which the branch stream crosses the main stream at ninety degrees defeats the purpose and usefulness of the fittings so designed.

Introducing fluids from a branch gravity flow stream into another horizontal branch or main fluid stream at ninety degrees substantially at right angles by means of the T or sanitary T fitting offers serious impedance to the fluid flow in both the branch and the main. Not only is the flow of fluids impeded but a backwash of liquids is created in both the branch and main conduits at each fixture discharge.

The Y method (forty-five degree angle) is an improvement over the T method (ninety degree angle) but in the Y branch fitting the branch fluid stream is impeded by striking the pipe wall opposite the branch inlet opening. The improvement of the Y branch fitting over the T branch fitting is generally accepted and the best drainage practice of today requires that horizontal branches in drainage systems discharge into other horizontal branches or mains through Y branches or combination Y and ⅛ bend fittings.

I provide a fluid transmission system and fittings therefor, improving both the T method (ninety degree angle) of introducing fluids from a branch stream into a main and the Y method (forty-five degree angle) of introducing fluids from a branch flow stream into a main by reason of providing a fitting in which the laterally directed branch parallels the main fluid stream and both the branch fluid stream and the main fluid stream point straight into the outlet end of the fitting and discharge in the same direction.

I provide adjustability without extending the branch transversely beyond the limits of the diameter of the run of the fitting. In my design both the transverse extremities of the branch opening are equal to or less than the radii of the inside diameter of the fitting. Therefore the one fitting is employed for conditions where the direction of flow in the main or run is from right to left or from left to right.

In my design the flow in the branch entering the main is so deflected and directed that at the point of mergence with the flow in the main the two flows or streams are substantially parallel which is an improvement over both the T branch, or ninety degree cross-over, and the Y branch, or forty-five degree cross-over; in fact, my design eliminates the cross stream entirely and thereby facilitates the flow in both branch fluid stream and the main fluid stream, either or both flowing separately or together.

I provide a fluid transmission system and fittings therefor for obviating the disadvantages of the T and Y branches, of both the ninety degree and forty-five degree method of joining branch fluid streams with main fluid streams. I provide for the installation of a fluid transmission system in which a main is connected with various branches bearing different spaced relationships therewith without necessitating the use of fittings of many different shapes and sizes.

I provide a fluid transmission system, comprising a fluid conduit and a plurality of connections spaced along such conduit but in different relationships with respect thereto, all of such connections comprising like fixtures of standard construction, and each of such connections comprising a member cooperating with its standard fixture to effect the individual connection in the particular desired relationship with the main conduit, all of said members having substantially the same external dimensions.

I provide, as a manufacture, a conduit member having a portion for connection with a second conduit member, and a plurality of similarly shaped connecting devices each adapted for co-operation with said portion of the first conduit member, the respective connecting devices having differently positioned portions adapted to cooperate with the second conduit member, whereby the conduit members may be connected in a desired relationship by selection of an appropriate connecting device. I provide, as a manufacture, a conduit fitting comprising means for joining the fitting to each of a plurality of conduits and deflecting means within the fitting for smoothly deflecting material flowing therethrough between the conduits, at least one of said first mentioned means comprising an opening, and a plurality of connecting devices each adapted to cooperate with said opening, the respective connecting devices having differently positioned means for cooperation with the corresponding conduit, whereby the connection between the conduits may be effected regardless of the relative position thereof within certain limits by selection of an appropriate connecting device.

Other objects and advantages of the invention will become apparent as the following description of certain present preferred embodiments thereof proceeds.

In the accompanying drawings I have shown certain present preferred embodiments of the invention, wherein Figure 1 is a central longitudinal cross-sectional view through a conduit fitting;

Figure 2 is a bottom plan view of the fitting shown in Figure 1;

Figure 3 is an elevational view of the bushing shown in Figure 2;

Figure 4 is a central cross-sectional view through the bushing shown in Figure 3;

Figure 5 is a view similar to Figure 4 of a modified form of bushing;

Figure 6 is a central longitudinal cross-sectional view through an extension fitting having a modified form of bushing connected therewith;

Figure 7 is an elevational view of the fitting and bushing shown in Figure 6 as viewed from the right-hand side of such figure;

Figure 8 is an elevational view of the bushing shown in Figures 6 and 7;

Figure 9 is a central cross-sectional view through the bushing shown in Figure 8;

Figure 13:
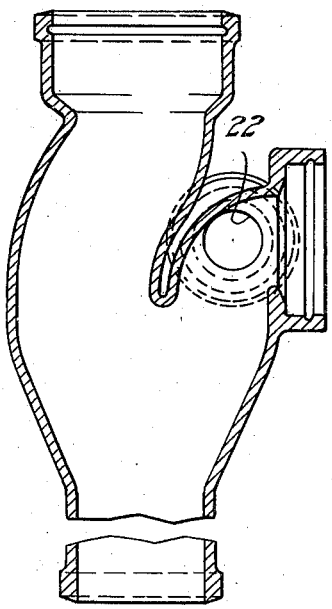
Figure 14:
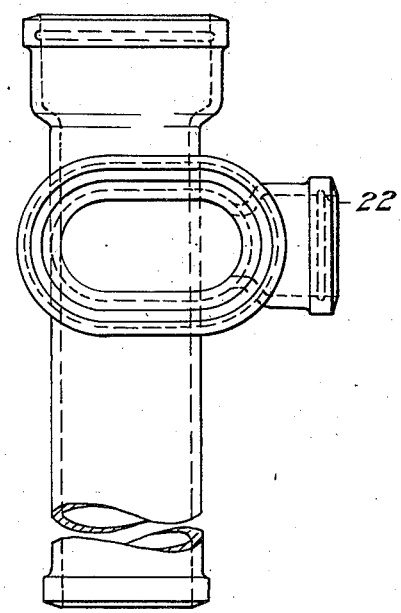
Figure 15:
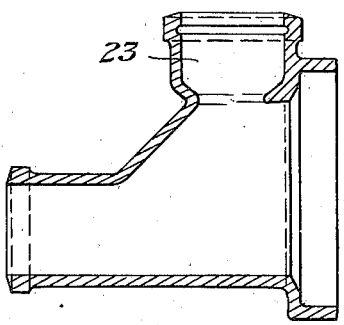
Figure 16:
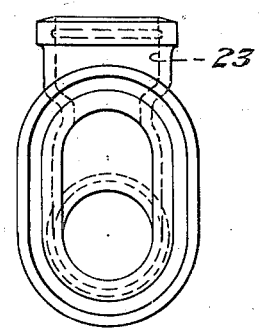

Figures 10, 11, and 12 are views similar to Figure 9 of modified forms of bushing;

Figure 13 is a view similar to Figure 1 of a modified form of fitting;

Figure 14 is a view of the fitting shown in Figure 13 as viewed from the right-hand side of such figure;

Figure 15 is a view similar to Figure 6 of a modified form of fitting;

Figure 16 is a view of the fitting shown in Figure 15 as viewed from the right-hand side of such figure;

Figure 17 is a diagrammatic view of a fluid transmission system; and

Figure 18 is a central cross-sectional view of a water closet bowl having a lateral waste outlet connected to a fitting similar to Figure 13. The fitting is located above the floor and behind the partition.

Referring more particularly to the drawings, there is shown in Figures 1 and 2 a fitting which may be installed in a right or left hand position securing four centers with two bushings and the said bushings may be reversed to secure the four positions and the diameter of the four openings is kept within the limits of the diameter of the pipe which permits the fitting to be used in a right or left hand position.

There is shown in Figures 1 and 2 a conduit fitting designated generally by reference numeral 2 having an inlet 3 and an outlet 4 for a main fluid stream moving generally in the direction of the arrows A, and an inlet 5 for a branch fluid stream moving generally in the direction of the arrow B. The branch conduit extends generally at right angles to the main, and if the ordinary T fitting were utilized for making the connection, the stream from the branch conduit would tend to cross the stream flowing in the main substantially at right angles, thereby seriously impeding the flow in the system. However, there is provided a deflecting device 6 extending into the interior of the fitting and having oppositely disposed walls 7 and 8. This deflecting device may be constructed with one wall in which case walls 7 and 8 merge into one wall. The wall 7 is curvedly formed so as to change its direction smoothly through substantially ninety degrees, one extremity 9 thereof being disposed in substantially tangential relationship to the direction of flow of fluid from the branch stream into the fitting. The opposite extremity 10 of the wall 7 extends substantially in the direction of flow of fluid in the main, that is to say, generally in the direction of the arrows A.

Fluid entering the fitting in the direction of the arrow B impinges against the wall 7, and by reason of the fact that the extremity 9 of such wall is disposed in substantially tangential relationship to the direction of flow of fluid thus entering the fitting, gradually and smoothly deflects the incoming fluid and causes it to change its direction through substantially ninety degrees and to leave the wall 7 at the portion 10 thereof while moving substantially in the direction of the arrows A.

The wall 8 is formed as a smooth reverse curve having an internally concave portion 11 and an internally convex portion 12. The extremity 13 of the portion 11 is disposed in substantially tangential relationship to the direction of flow of fluid in the main as it enters the fitting. The fluid is deflected by the portion 11 of the wall through a small angle, and then it is deflected back toward its normal direction of flow by the outside wall 14 of the fitting in conjunction with the wall portion 12. As the fluid moves forward it is deflected somewhat inwardly by the wall portion 15 so that it joins the fluid introduced from the branch conduit at a negligible angle and therefore in effect while the fluid from both conduits is moving substantially in the same direction.

The fluid from the branch is deflected so as to be moving substantially in the direction of flow of fluid in the main just previous to mingling of the two streams. Thus, when the streams come together their tendency is to assist each other in moving forward rather than to impede each other's progress, as would be the case if the streams were moving in substantially diverse directions at the time of mingling. The slight deflection of the main fluid stream out of and back into its normal direction of flow enables the deflection of the fluid from the branch stream before the two streams mingle. This deflection is smooth and gradual throughout, and the resistance thereby offered to flow of the main stream is negligible.

The features above described are described and claimed in my copending application Serial No. 736,220, filed of even date herewith, and do not per se constitute the present invention, although such features in certain instances combine with other features in the production of certain combinations hereinafter described and claimed. For a more detailed description and explanation with respect to the features above described reference may be had to my said copending application.

Although in the embodiment shown in Figures 1 and 2 the normal direction of flow of fluid in the main and branch streams, respectively, is in the direction of the arrows A and B, the fitting may also be used to advantage when the flow of fluid is in the reverse direction, as it very materially reduces the resistance offered to the branch stream upon leaving the main stream through fittings of the ordinary type. In other words, the fitting of Figures 1 and 2 is not limited to use in a one-way system, but may be used with effect in a two-way system or in a system in which the primary direction of flow is contrary to the arrows A and B. The fittings may be used with equal effectiveness in any position, either vertical, horizontal, or at an angle to the vertical or horizontal, or both.

Whereas the inlet and outlet connections 3 and 4, respectively, for the main fluid stream are of substantially circular cross-section, as is usual practice, the connection 5 for the branch fluid stream is not of circular cross-section, but is elongated in the transverse direction, as shown in Figure 2. This elongation extends transversely to the limits of the diameter of the main fluid stream and the extremities 32 and 33 of the opening 5 coincide with the diameter of the main fluid stream. This elongation may be equal to or less than the diameter of the main fluid stream but not larger or the design will require right and left hand fittings. Such elongation is for a specific purpose which will presently become apparent in connection with the description of Figures 3, 4, 5, and 17.

The portion 38 of the fitting of Figure 4 is formed to provide a peripheral bushing seat 37 inclined transversely of the fitting and adapted to receive a bushing 28 of a shape to conform with the portions 38 and 37 of the fitting whereby to cooperate therewith to form a joint. The bushing has an inclined peripheral bearing portion 35 adapted to lie against the seat 37 of the fitting to make a fluid tight connection between the fitting and bushing. A peripheral cavity 36 is provided for the reception of packing or calking to maintain the joint. The bushing 28 is provided with an opening 30 of a generally circular cross section with which another pipe or conduit is adapted to be connected.

Figure 5 shows a similar bushing identical in external dimensions and shape with the bushing 28 and which differs from such bushing only in the relative position therein of the opening 30. The bushing is adapted for cooperation with the fitting of Figures 1 and 2 precisely as is the bushing 28 but on account of the relatively differently positioned openings 30 the fittings and the conduit to be connected therewith may assume different relative positions generally in the direction of the major axis of the opening of the fitting. For example, in Figure 4 the bottom of the conduit to be connected with the bushing 28 at the opening 30 will coincide with the bottom of the fitting. If, however, the bushing 34 of Figure 5 is used, the conduit will be somewhat elevated with respect to the bottom of the fitting. The bushing 34 of Figure 5 may be inverted, raising the conduit still higher and the bushing 28 of Figure 4 may be used in the inverted position to raise the conduit to the top of the fitting so that the top of the conduit to be connected to the opening 30 will coincide with the top of the fitting. The bushings 28 and 34 are shown installed in both positions in Figure 17.

Of course only one of the bushings is used with the fitting at one time, but the fitting in combination with an appropriate bushing appropriately positioned therein is adapted to enable the connection therewith of a conduit at various elevations relative thereto. This feature is of particular importance in connection with the construction of fluid transmission systems having a main conduit and a number of branch conduits connected with the main conduit but bearing somewhat different spaced relationships with respect thereto. For example, if it is desired to connect a battery of water closets to a drain slightly inclined with respect to the level of the closets the fitting of Figure 1 may be used for each of the connections and an appropriate one of the bushings is selected for each individual connection so as to enable the joining of the corresponding fitting to the drain pipe at the particular level of the drain pipe as it passes such fitting, thus eliminating the necessity for the use of many different fittings of various sizes and shapes. The entire system may be installed using standard fittings, one of the fittings such as that of Figures 1 and 2, or a similar fitting appropriate for the work, being used at each connection in conjunction with an appropriate bushing. Therefore, the only parts of different characteristics required in order to make the various connections are the bushings themselves, which are small, light in weight, comparatively cheap in cost and very easy to carry and install. By reason of the small bulk and cheapness of the bushings, a stock or supply of them may be kept on hand at a cost equal to only a fraction of the cost necessary for maintaining a stock of standard fittings of various sizes and shapes such as would be necessary for the construction of a system such as that in question with present methods. Furthermore, each of the bushings may be used in two different relationships with respect to the fitting and thus accomplishes the results of two different fittings. The installation of the bushings is a very simple operation and can be performed by an ordinary mechanic. This is not true when it is necessary to make complicated connections of pipes, elbows, Y and T fittings and the like. No particular training or experience is necessary to select an appropriate bushing, as a bushing is used which brings the center of the opening 30 at the position desired for connection with the drain pipe.

If desired, the standard fitting itself may be connected in as a part of the main conduit, an appropriate bushing being used to enable making the connection between the fitting and a given branch conduit at the elevation of the latter. This type of construction is usual for certain types of installations, although the same result is accomplished regardless of whether the standard fitting is incorporated as a part of the main conduit or as a part of the branch conduit. The proper selection of a bushing in any case enables the connection desired.

Referring again to Figures 1 and 2, the deflecting wall 7 is equally effective for smoothly changing the direction of flow of fluid entering the fitting in the direction of the arrow B regardless of the point along the major axis of the opening 5 at which such fluid is introduced. This construction obviates the necessity of any adjustments or alterations at all in order to obtain the results desired by reason of the use of the deflecting means as above described and as fully described and explained in my said co-pending application.

Fittings as of Figures 1 and 2 are generally installed in horizontal conduits serving fixtures with lateral waste outlets. In Figures 1 and 2 the major axis of the opening 5 extends transversely vertical to the limits of the diameter of the conduit. The adjustments are vertical. Fittings such as that of Figures 1 and 2 may be installed in vertical conduits and provide horizontal adjustment. Fittings as of Figures 1 and 2 installed in vertical conduits may accomplish vertical adjustment by changing the position of opening 5. In this event the extremity 9 of the wall 7 will have to be raised and the walls 7 and 8 changed to conform to the change. The lower part of the fitting from the deflecting means 6 to the outlet 4 will remain the same. The elongated opening may also be used with a fitting adapted for connecting conduits extending at an acute angle to each other by appropriate modification.

The fitting shown in Figures 6 and 7 is of a different type from that of Figures 1 and 2 except that it has in common with the fitting shown in the latter mentioned figures a non-circular or elongated connecting portion 16. The portion 16 of Figures 3 and 4 is substantially the same for practical purposes as the portion 38 of Figures 4 and 5, and the preceding detailed description with respect to Figures 3, 4, and 5 applies equally to the Figures 6 and 7 except that the portion 16 has been extended to increase the range of adjustability.

The bushing 18 shown in Figures 6 and 7 is also shown in Figures 8 and 9. Figures 10, 11, and 12 show similar bushings identical in external dimensions and shape with the bushing shown in Figures 8 and 9 and which differ from such bushing only in the relative position therein of the opening 21. Each of the bushings of Figures 10, 11, and 12 is adapted for cooperation with the fitting of Figures 6 and 7 precisely as is the bushing shown in Figures 8 and 9.

Figures 13, 14, 15, and 16 disclose modified forms of fittings having the elongated opening as above described. Figures 13 and 14 show a fitting similar to that of Figures 1 and 2 except that the fitting of Figures 13 and 14 also includes a vent 22 and the branch opening has been extended upwardly beyond the limits of the radius of the inside diameter of the main fluid stream. The fitting of Figures 15 and 16 is generally similar to that of Figures 6 and 7 except that that of Figures 15 and 16 includes a vent 23. The general principles involved and above described, however, are in no sense altered.

Figure 17 shows diagrammatically a fluid transmission system such as might be used, for example, in draining batteries of water closets in an office building. The soil stack is shown at 24 and the vent stack at 25. The horizontal branch soil pipes are indicated respectively, at 26 and 27, each of such horizontal branch soil pipes being inclined somewhat toward the soil stack. The horizontal branch soil pipes 26 and 27 are located above the finished floor in a pipe space or utility corridor behind the partition against which the closet bowl rests. The horizontal branch soil pipes 26 and 27 are of a larger diameter than the openings thereof which permits the elongation to extend in a transverse direction to the limits of the diameter of the horizontal branch soil pipes 26 and 27. This elongation may be equal to or less than the diameter of the horizontal branch but not larger or the design will require right and left hand fittings similar to Figure 14. Employing fittings 29, the type of fittings of Figures 1 and 2, makes possible placing branch soil pipes 26 and 27 above the floor, avoiding the piercing of floor slabs, the placing of pipe thimbles, and eliminating raised floors and/or dropped ceilings to house pipes and fittings.

The various bushings used to effect the connections between the individual closets and the respective horizontal branch soil pipes 26 and 27 are shown at 28 and 34, such bushings generally corresponding to those above described and shown in Figures 16 to 18, inclusive. In Figure 17 the respective fittings 29 receiving the bushings 28 and 34 are connected in as portions of the respective horizontal branch soil pipes 26 and 27. Such fittings 29 as shown are substantially of the type of the fittings of Figures 1 and 2. The various fittings in Figure 17 are at different levels due to the inclination of the horizontal branch soil pipe, but the selection of proper bushings enables the positioning of the respective openings 30 on each floor all at substantially the same level as indicated by the lines C—D and E—F. This enables proper connections to be made with the individual closets all of which on each floor are disposed substantially at the same level.

Figure 12 is a central cross-sectional view of a water closet bowl having a lateral waste outlet connected to a horizontal branch conduit placed above the floor and on the same level with the closet bowl and utilizing a fitting having a vent 31 similar to fitting of Figures 13 and 14. In this cross-sectional view of the water closet bowl the relative location of the finished floor and wall with the fitting and the connection of the closet to the fitting at the level of the lateral closet outlet regardless of the level of the fitting within the limits imposed by the range of adjustment possible is made clear.

The particular shape of the fitting and of the outlet opening therein, as well as of the respective bushings, so long as each bushing is shaped to cooperate with the fitting, is immaterial; it being necessary, however, to make provision for differently positioning the openings in the respective bushings. For example, this would be possible if the bushings were circular or if they were rectangular or any other appropriate shape. In fact, the use of a circular bushing would have the added advantage that not only could the connection be adjusted in one direction, but it could also be adjusted in a direction at right angles thereto. However, in order to obtain a substantial degree of adjustment with a circular bushing it would be necessary to use a bushing and corresponding outlet opening of considerable size, whereas the size of an elongated bushing may be considerably reduced while still providing for substantial adjustment in one direction.

The standard fitting may be provided with the deflecting means above described, when deemed advisable, with the added advantages pointed out, although in its broader aspects the present invention is not so limited. In fact, while I have shown and described certain present preferred embodiments of the invention, it is to be distinctly understood that the same is not limited thereto but may be otherwise variously embodied within the scope of the following claims.

I claim:

1. For use in connecting to a main conduit a series of branch conduits, a series of similar connecting devices adapted to be fitted to openings in the main conduit, each of said connecting devices having an aperture for cooperation with a branch conduit, the apertures in the several connecting devices being located at different distances from the respective centers thereof, whereby through appropriate selection of said connecting devices the branch conduits may be arranged with their axes at desired predetermined different elevations with respect to the axis of the main conduit.

2. For use in connecting to a main conduit a series of branch conduits, a series of similar bushings adapted to be fitted within and sealed to openings in the main conduit, each of said bushings having an aperture for cooperation with a branch conduit, the apertures in the several bushings being located at different distances from the respective centers thereof, whereby through appropriate selection of said connecting devices the branch conduits may be arranged with their axes at desired predetermined different elevations with respect to the axis of the main conduit.

3. For use in connecting to a main conduit a series of branch conduits, a series of similar generally elongated connecting devices adapted to be fitted to openings in the main conduit, each of said connecting devices having an aperture for cooperation with a branch conduit, the apertures in the several connecting devices being located at different points along the major axes thereof, whereby through appropriate selection of said connecting devices the branch conduits may be arranged with their axes at desired predetermined different elevations with respect to the axis of the main conduit.

4. As a manufacture, a plurality of similar fittings adapted to be connected in a main conduit, said fittings each having an opening for connection of a branch conduit therewith, and a series of similar connecting devices adapted to be fitted to said openings, each of said connecting devices having an aperture for cooperation with a branch conduit, the apertures in the several connecting devices being located at different distances from the respective centers thereof, whereby through appropriate selection of said connecting devices the branch conduits may be arranged with their axes at desired predetermined different elevations with respect to the axis of the main conduit.

5. As a manufacture, a plurality of similar fittings adapted to be connected in a main conduit, said fittings each having an opening for connection of a branch conduit therewith, and a series of similar connecting devices adapted to be fitted to said openings, each of said connecting devices having an aperture for cooperation with a branch conduit, the apertures in the several connecting devices being located at different distances from the respective centers thereof and being so positioned with respect thereto that upon application of said connecting devices to said openings each of said apertures opens throughout substantially the entire height thereof into the bore of the fitting to which its connecting device is applied while permitting arrangement, through appropriate selection of the connecting devices, of the branch conduits with their axes at desired predetermined different elevations with respect to the axis of the main conduit.

6. A conduit system comprising a main conduit having similar openings spaced at intervals therealong, a series of similar connecting devices fitted to said openings, each of said connecting devices having an aperture for cooperation with a branch conduit, the apertures in the several connecting device being located at different distances from the respective centers thereof, and a branch conduit connected with each of said connecting devices at the aperture therein and communicating through said aperture with said main conduit.

WILLIAM C. GROENIGER.